US008360712B2

(12) United States Patent
Deo et al.

(10) Patent No.: US 8,360,712 B2
(45) Date of Patent: Jan. 29, 2013

(54) METHOD AND APPARATUS FOR LABYRINTH SEAL PACKING RINGS

(75) Inventors: Hrishikesh Vishvas Deo, Saratoga Springs, NY (US); Binayak Roy, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 555 days.

(21) Appl. No.: 12/692,369

(22) Filed: Jan. 22, 2010

(65) Prior Publication Data

US 2011/0182719 A1  Jul. 28, 2011

(51) Int. Cl.
*F01D 11/08* (2006.01)
(52) U.S. Cl. .... 415/1; 415/173.3; 415/173.5; 415/174.5
(58) Field of Classification Search ........... 415/1, 173.2, 415/173.3, 173.5, 174.2, 174.5
See application file for complete search history.

(56) References Cited

U.S. PATENT DOCUMENTS

| | | | | |
|---|---|---|---|---|
| 4,351,532 A | * | 9/1982 | Laverty | 277/419 |
| 4,513,975 A | * | 4/1985 | Hauser et al. | 415/174.4 |
| 5,029,876 A | * | 7/1991 | Orlando et al. | 415/174.5 |
| 5,143,383 A | * | 9/1992 | Glynn et al. | 415/174.4 |
| 5,224,713 A | * | 7/1993 | Pope | 415/173.5 |
| 5,890,873 A | * | 4/1999 | Willey | 415/173.5 |
| 6,394,459 B1 | | 5/2002 | Florin | |
| 7,210,899 B2 | | 5/2007 | Wilson, Jr | |
| 2008/0089783 A1 | | 4/2008 | Addis | |
| 2008/0267763 A1 | | 10/2008 | Wahl et al. | |
| 2009/0304493 A1 | * | 12/2009 | Awtar | 415/1 |

OTHER PUBLICATIONS

Justak, John F., et al.; "Self-Acting Clearance Control for Turbine Blade Outer Air Seals", Proceedings of ASME Turbo Expo 2009: Power for Land, Sea and Air, GT2009, Jun. 8-12, 2009, Orlando, FL, USA.

* cited by examiner

*Primary Examiner* — Igor Kershteyn
(74) *Attorney, Agent, or Firm* — Fletcher Yoder, P.C.

(57) ABSTRACT

A seal assembly for a turbomachine may include at least one arcuate plate coupled to an interior surface of a stationary housing; a circumferentially-segmented packing ring disposed intermediate to a rotor and the plate; a plurality of arcuate teeth disposed intermediate to the ring and the rotor, wherein a clearance of each tooth decreases progressively going from an upstream side of the turbomachinery to a downstream side; wherein the progressive decrease in the clearances of the teeth creates a passive feedback, such that as a tip clearance decreases, outward radial forces cause the packing ring to move away from the rotor and as the tip clearance increases, inward radial forces cause the packing ring to move toward the rotor; and a biasing member disposed intermediate to the arcuate plate and the ring and coupled to both.

21 Claims, 8 Drawing Sheets

METHOD AND APPARATUS FOR LABYRINTH SEAL PACKING RINGS

BACKGROUND OF THE INVENTION

The subject matter disclosed herein relates to the field of seals used in turbomachinery. More particularly, the subject matter disclosed herein relates to a progressive clearance labyrinth seal for application at the interface of a rotating component, such as a rotor in a turbine or compressor, and a stationary component, such as a casing or stator.

Labyrinth seals used in gas turbines, steam turbines, aircraft engines, compressors, and other turbomachinery systems are susceptible to excessive leakage because a rotor clearance may be configured to be large enough to help prevent the rotor from rubbing against the seal. If the rotor does contact the seal, which is referred to as rotor-rub, the seal may be damaged creating an even larger clearance thereafter. Specifically, rotor-rub may occur in a gas turbine during a number of rotor transients that may include rotor dynamic excitation, relative thermal distortion of the rotor and stator, or shift in the center of the rotor because of development of a hydrodynamic lubricating film in the journal bearings with increasing speed. Deflection may occur when a gas turbine passes through critical speeds, such as during start-up. Distortion may be caused by thermal discrepancies between different components within the gas turbine. A large clearance between the seal and rotor is needed because a labyrinth seal may be unable to adjust its clearance during the rotor transients as it may be rigidly coupled to the stator. The clearances between rotating and stationary components of gas turbines may affect both the efficiency and performance of the turbine. In the design of gas turbines, close tolerances between components may result in greater efficiency. Similar rotor transients occur in other turbomachinery systems such as steam turbines, aircraft engines, or compressors, and the transients may often be difficult to predict.

In addition, labyrinth seals may be configured with a Variable Clearance Positive Pressure Packing (VCPPP) ring that biases the labyrinth seal away from the rotor to a large clearance by means of a spring. This helps prevent a rotor-rub during start-up rotor transients. When the differential pressure across the seal builds up beyond a certain value, the forces on the VCPPP ring cause it to close to a small rotor clearance. In the VCPPP ring design, there exists a steam-seal joint where the VCPPP ring contacts the casing or stator. The friction at this joint may introduce a hysteresis in the opening and closing of the VCPPP ring. If there are rotor transients after the VCPPP ring has closed, there will be rotor-rubs and damage to labyrinth teeth.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a turbomachine includes a stationary housing and a rotor rotating about an axis. The seal assembly for the turbomachine includes at least one arcuate plate coupled to an interior surface of the stationary housing and positioned in a radial plane. In addition, the seal assembly includes a circumferentially-segmented packing ring disposed intermediate to the rotor and the plate. The packing ring is positioned to move along the plate in a radial direction. The seal assembly also includes a plurality of arcuate teeth disposed intermediate to the packing ring and the rotor. A clearance of each tooth decreases progressively going from an upstream side of the turbomachinery to a downstream side of the turbomachinery. The progressive decrease in the clearances of the teeth creates a passive feedback in the hydrostatic forces generated by differential pressure across the seal assembly, such that as a tip clearance decreases, outward radial forces cause the packing ring to move away from the rotor and as the tip clearance increases, inward radial forces cause the packing ring to move toward the rotor. Finally, the seal assembly also includes a biasing member disposed intermediate to the arcuate plate and the packing ring and coupled to both.

In a second embodiment, a method of sealing a gas path between a stationary housing of a turbomachine and a rotating element turning about an axis of the turbomachine includes disposing at least one arcuate plate on the inner surface of the stationary housing in a radial plane. The method also includes disposing a circumferentially-segmented packing ring adjacent to the arcuate plate. In addition, the method includes disposing a plurality of arcuate teeth intermediate to the packing ring and the rotating element. The tooth clearances decrease progressively going from an upstream side of the turbomachinery to a downstream side of the turbomachinery. The method also includes disposing a biasing member intermediate to the packing ring and the stationary housing. The biasing member is coupled to the packing ring and the stationary housing.

In a third embodiment, a turbine or compressor includes a rotor rotating about an axis, a stationary housing surrounding the rotor; and a circumferentially-segmented seal assembly disposed intermediate to the rotor and the stationary housing. Each segment of the seal assembly further includes at least one arcuate plate coupled to an interior surface of the stationary housing and positioned in a radial plane. Each segment of the seal assembly also includes an arcuate segment of a packing ring disposed intermediate to the rotor and the plate. The packing ring is positioned to move along the plate in a radial direction. The arcuate segment does not include a steam-seal joint. Each segment of the seal assembly also includes a plurality of arcuate teeth disposed intermediate to the packing ring and the rotor. A clearance of each tooth decreases progressively going from an upstream side of the turbine or compressor to a downstream side of the turbine or compressor. The progressive decrease in the clearances of the teeth creates a passive feedback in the hydrostatic forces generated by differential pressure across the seal assembly, such that as a tip clearance decreases, outward radial forces cause the packing ring to move away from the rotor and as the tip clearance increases, inward radial forces cause the packing ring to move toward the rotor. Finally, each segment of the seal assembly includes a biasing member disposed intermediate to the arcuate plate and the arcuate segment of the packing ring. The biasing member is coupled to the arcuate plate and the packing ring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
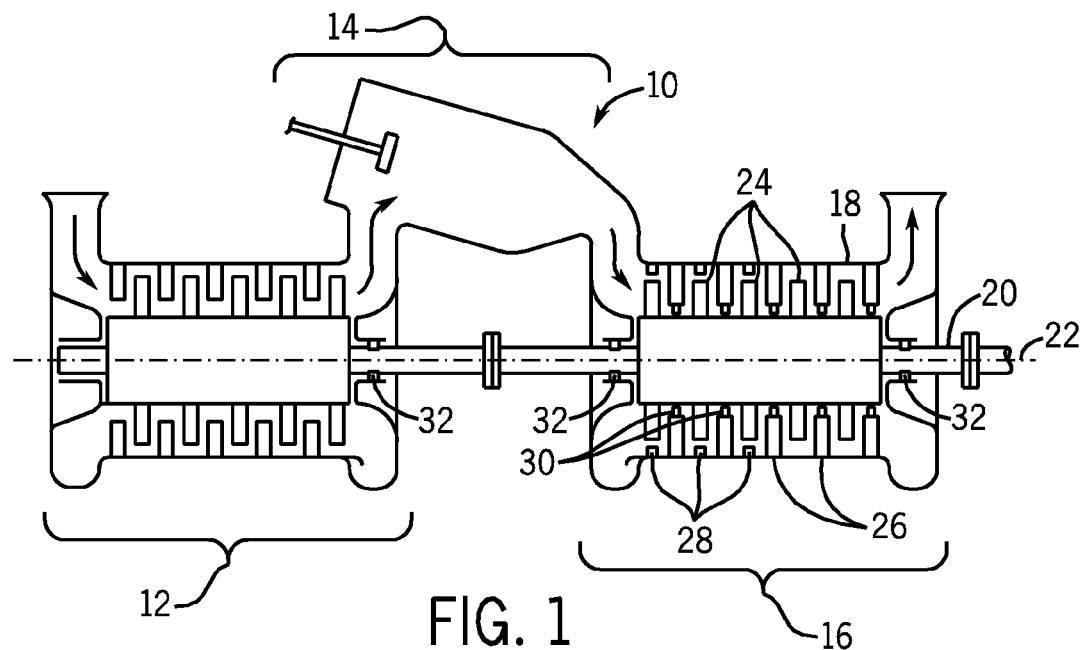
FIG. 1 is a cross-sectional view of a turbine system in accordance with an embodiment of the present disclosure.

FIG. 1 is a cross-sectional view of an embodiment of a turbine system 10, which may include a variety of components, some of which are not shown for the sake of simplicity. In the illustrated embodiment, the gas turbine system 10 includes a compressor section 12, a combustor section 14, and a turbine section 16. The turbine section 16 includes a stationary housing 18 and a rotating element 20, which rotates about an axis 22. Moving blades 24 are attached to the rotating element 20 and stationary blades 26 are attached to the stationary housing 18. The moving blades 24 and stationary blades 26 are arranged alternately in the axial direction. There are several possible locations where seal assemblies may be installed, such as location 28 between a shrouded moving blade 24 and stationary housing 18, location 30 between the rotating element 20 and stationary blade 26, or an end-packing sealing location 32 between rotating element 20 and stationary housing 18.

Figure 2:
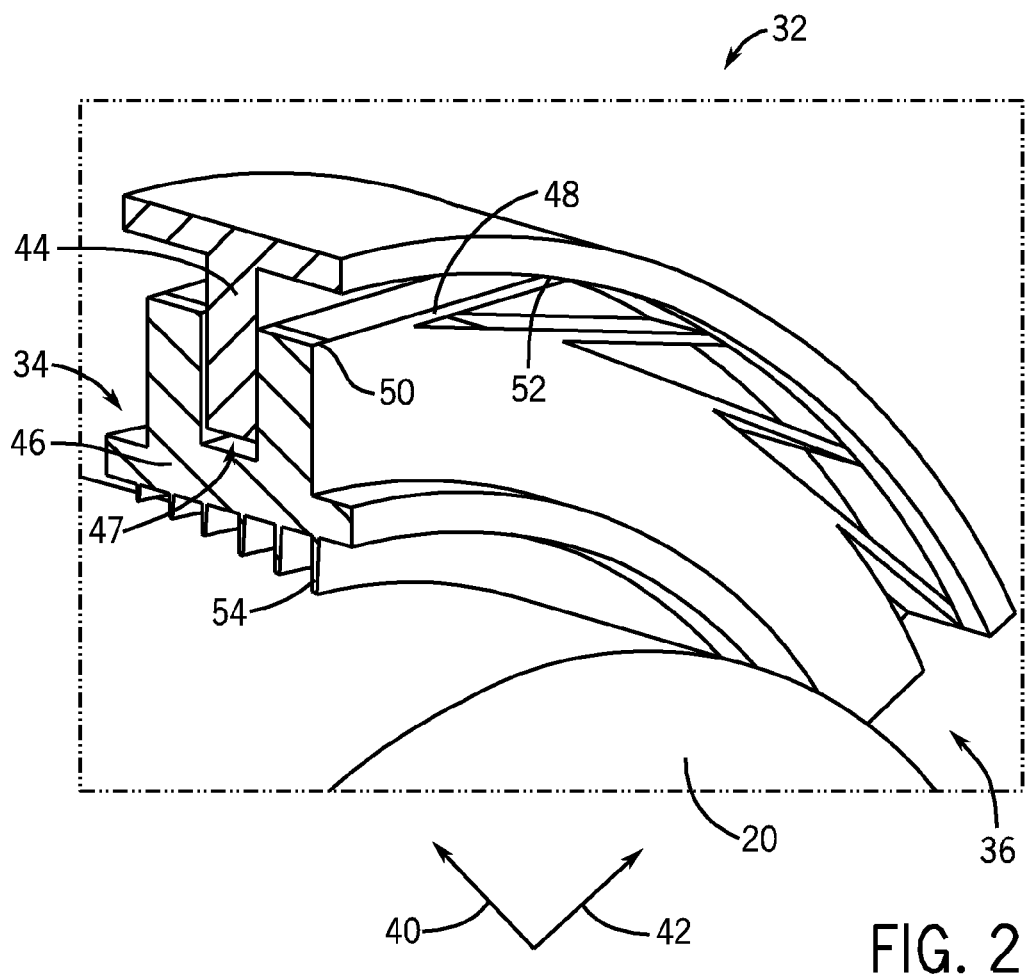
FIG. 2 is a perspective view of a sealing area of a turbine system, as shown in FIG. 1, having a seal assembly in accordance with an embodiment of the present technique.

FIG. 2 is a perspective view of an embodiment of the seal assembly 32 of the turbine system 10 of FIG. 1. Air, fuel, or other gases enters the turbine system 10 at an upstream side 34 and exits the system at a downstream side 36. In the illustrated embodiment, the axial direction is indicated by axis 40 and the radial direction is indicated by axis 42. An arcuate plate 44 is coupled to the arcuate surface of the stationary housing 18 facing the rotating element 20. In certain embodiments, the plate 44 may be made from steel or steel alloys. Moreover, the cross-section of the plate may appear T-shaped as depicted in FIG. 2. The plate 44 may be rigidly attached to the housing 18. In addition, the plate 44 may be disposed as a complete 360-degree ring, as two 180-degree arcs, or smaller arcs that together form a complete ring. Further, in certain embodiments, the plate 44 may consist of a plurality of plates similarly configured.

An arcuate packing ring 46 is disposed intermediate to the plate 44 and the rotating element 20. The ring 46 may consist of a plurality of segments that together form a complete ring. In certain embodiments, the ring may be made from steel or steel alloys. Moreover, the ring is configured to mate with the plate 44, with a gap 47. Biasing members 48 are disposed intermediate to the stationary housing 18 and the packing ring 46. The biasing members 48 act as bearing flexures and provide a high stiffness in the axial direction 40 and a low stiffness in the radial direction 42. The high axial stiffness restricts significant motion in the axial direction. The low radial stiffness allows the packing ring 46 to move in the radial direction. In addition, the biasing member supports the weight of the packing ring 46 and prevents it from touching the rotating element 20 under no-flow conditions. In certain embodiments, the biasing member 48 may consist of a plurality of flexures. One end 50 of each flexure may be mechanically coupled to the packing ring 46 and the other end 52 of each flexure may be mechanically coupled to the stationary housing 18 or to the plate 44 when it is T-shaped. In certain embodiments, examples of mechanically coupling may include bolting, welding, or other suitable techniques for mechanically affixing two structures. In other embodiments, the flexure end 50 may be an integral part of the packing ring 46 and mechanically affixed to the housing 18. In yet another embodiment, the flexure end 52 may be an integral part of the stationary housing 18 or plate 44 when it is T-shaped, and mechanically affixed to the packing ring 46. In this embodiment, each flexure is shown as a cantilever with a large width to thickness aspect ratio. Other flexure designs are possible that also achieve a high axial stiffness and low radial stiffness.

The packing ring 46 further includes a plurality of arcuate teeth 54 coupled to the surface of the ring facing the rotating element 20. The segments of each tooth disposed on each segment of the ring 46 together form a complete ring around rotating element 20. In certain embodiments, the teeth 54 may be made from a steel alloy. Moreover, the clearances between the teeth and the rotating element 20 become progressively smaller from the upstream side 34 of the turbine or compressor to the downstream side 36. This may be achieved by progressively increasing the tooth heights going from the upstream side 34 to the downstream side 36. The decrease in clearances may be linear, quadratic, parabolic, or arbitrary in nature. In addition, the spacing between adjacent teeth may be the same or may vary, which is discussed hereinafter.

Figure 3:
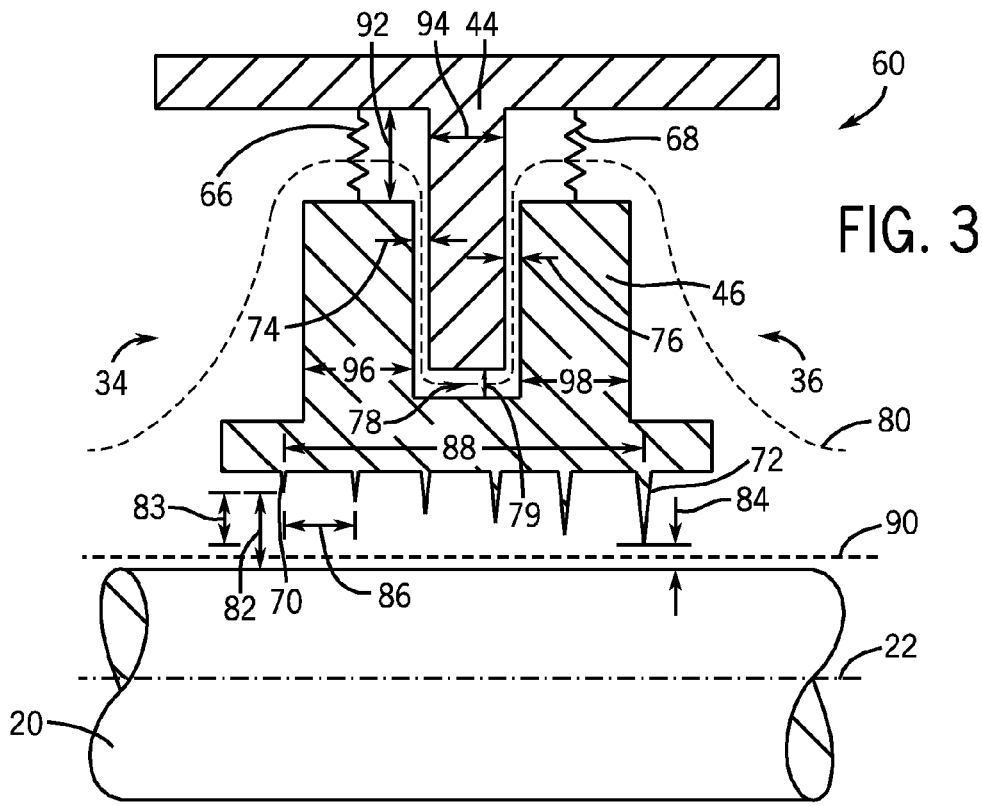
FIG. 3 is a cross-sectional view of a seal assembly with teeth on the packing ring in accordance with an embodiment of the present technique.

FIG. 3 is a cross-sectional view of an embodiment of a seal assembly 60 with teeth on the packing ring 46. In the illustrated embodiment, the packing ring 46 is coupled to plate 44 by two sets of flexures, an upstream side set of flexures 66 and a downstream side set of flexures 68. The radial compliance of the upstream set 66 and downstream set 68 of flexures is indicated schematically as springs. In the particular embodiment shown, upstream and downstream arrangements of flexures are used for the packing ring 46 to correspond with the upstream and downstream portions of the ring surrounding the plate 44. A front gap 74 exists between the upstream portion of the packing ring 46 and the plate 44 and similarly a back gap 76 exists between the downstream portion of the packing ring and the plate. These gaps provide flow resistance to the leakage flow, and should be minimized to reduce leakage flow. In certain embodiments, the front gap 74 and back gap 76 may be between approximately 50 micrometers and 250 micrometers. The high axial stiffness of the flexures maintains the front and back gaps at approximately the same value during operation. A pocket 78 exists between the packing ring 46 and the plate 44. The height 79 of the pocket 78 is designed to allow radial motion sufficient to avoid rotor-rubs during rotor transients. Gases leak through leakage path 80 that exists through the front gap 74, pocket 78, and back gap 76. Thus, the front gap 74 and back gap 76 are configured to reduce the amount of gases that leak through the path 80. Moreover, the packing ring 46 does not include a steam-seal joint in order to eliminate friction, which allows the packing ring to move radially in response to passive feedback forces discussed below.

Figure 4:
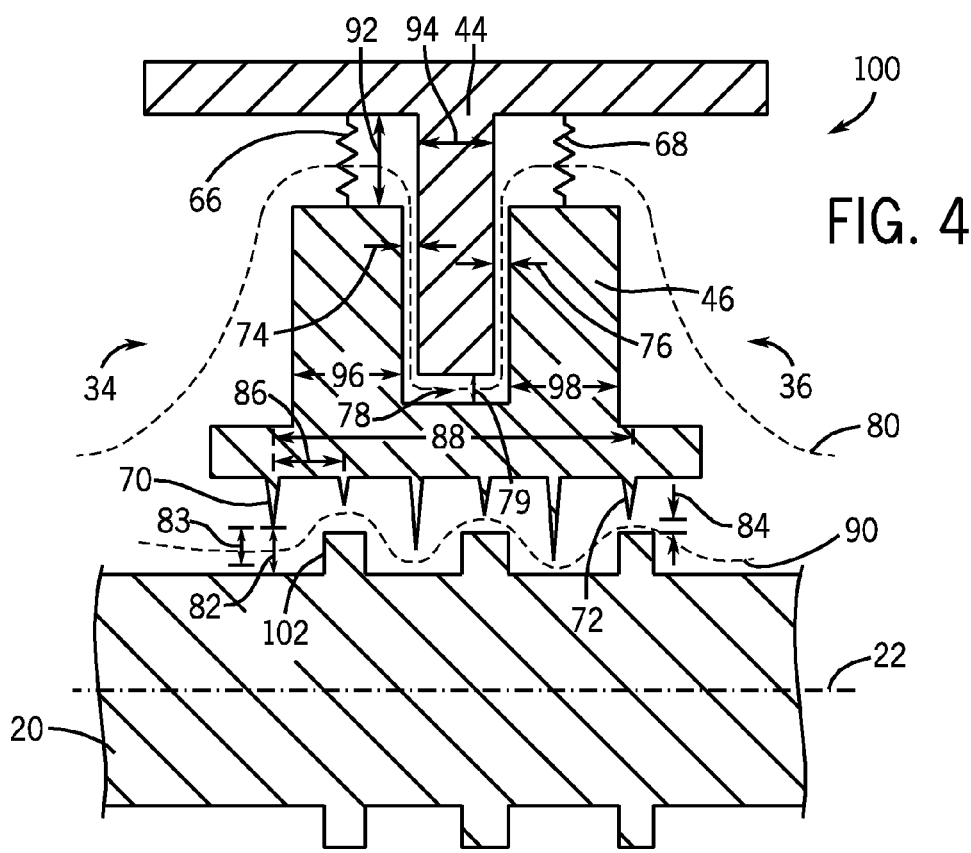
FIG. 4 is a cross-sectional view of a seal assembly with teeth on the packing ring and raised lands on the rotating element in accordance with an embodiment of the present technique.

The packing ring 46 further includes a plurality of arcuate teeth, including an upstream side tooth 70 and a downstream side tooth 72, disposed on the surface facing rotating element 20. The distance between the tip of downstream tooth 72 and the rotating element 20 is defined as the downstream tip clearance 84. In certain embodiments, the operating downstream tip clearance 84 may be between approximately 125 micrometers and 380 micrometers. The distance between the tip of upstream tooth 70 and the rotating element 20 is defined as the upstream tip clearance 82. The difference between the upstream tip clearance 82 and the downstream tip clearance 84 is defined as the clearance progression 83, which in certain embodiments, may be between approximately 400 micrometers and 1400 micrometers. The upstream tip clearance 82 is greater than the downstream tip clearance 84. Moreover, the clearance of each tooth progressively decreases moving from the upstream side 34 to the downstream side 36. This progression of tooth clearances creates passive feedback forces, which are discussed hereinafter, acting on the packing ring 46. Turning to FIG. 4, a cross-sectional view of an alternative embodiment of a seal assembly 100 with raised lands 102, which also illustrates the progressive decrease of tooth clearances moving from the upstream side 34 to the downstream side 36, is shown. Such "hi-lo" features may be useful in creating a more tortuous path for the leakage flow. As illustrated in FIGS. 3 and 4, the spacing 86 between adjacent teeth may be uniform or non-uniform. For example, in one embodiment, the spacing 86 may increase moving from the upstream side 34 to the downstream side 36. Further, the width of the labyrinth seal 88 depends on the differential pressure across it. Finally, gases leak through leakage path 90 that exists between the tip of each tooth and the rotating element 20, and ultimately through downstream tip clearance 84. Thus, the downstream tip clearance 84 is configured to reduce the amount of gases that leak through the path 90.

Other dimensions shown in FIGS. 3 and 4 include the distance 92 between the packing ring 46 and plate 44. The minimum value of distance 92 should allow for expected radial transients. The maximum value of distance 92 is determined by packaging constraints. The width 94 depends on the differential pressure across the seal, as the plate 44 should not deflect significantly because of the differential pressure.

Figure 5:
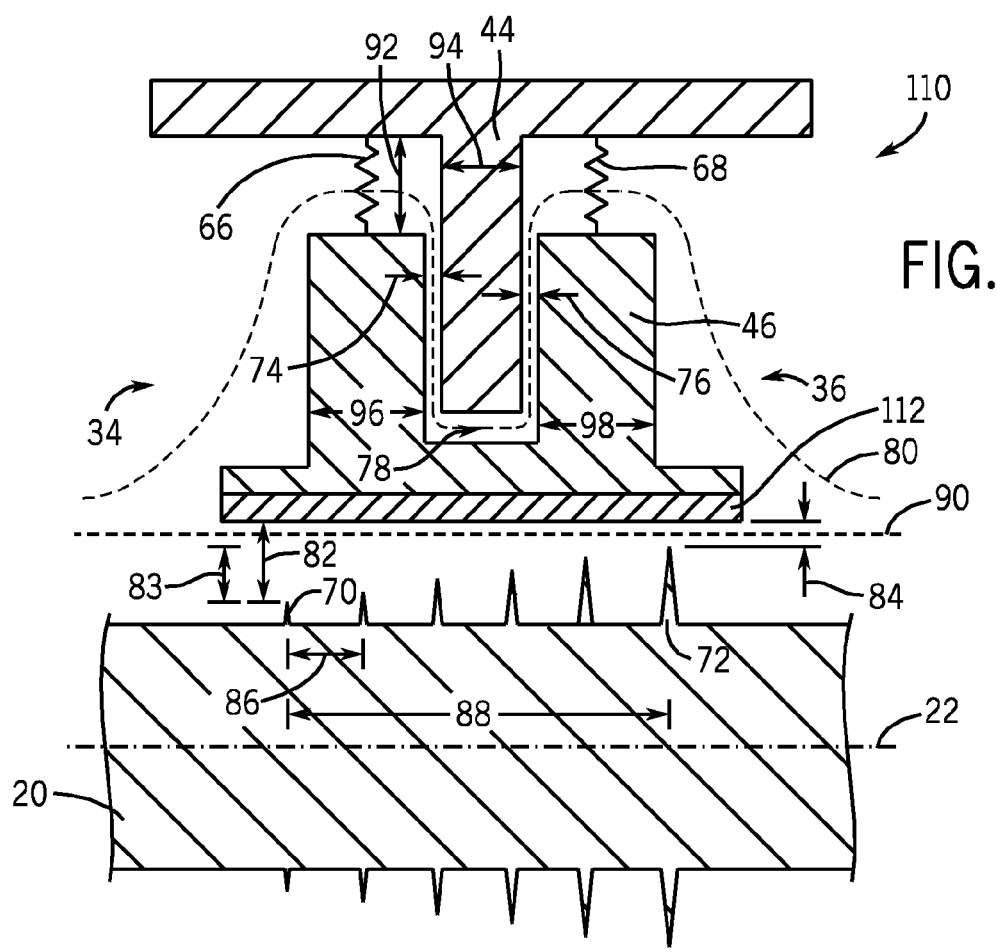
FIG. 5 is a cross-sectional view of a seal assembly with teeth on the rotating element in accordance with an embodiment of the present technique.

FIG. 5 is a cross-sectional view of an alternative embodiment of a seal assembly 110 with teeth on the rotating element 20. In the illustrated embodiment, all aspects of the teeth including height, spacing, and configuration may be identical to the teeth disposed on the packing ring in FIG. 3. The packing ring 46 is identical to the ring in FIG. 3 except that instead of having teeth disposed on the surface facing the rotating element 20, an abradable coating 112 is provided on the ring. In certain embodiments, the abradable coating 112 may include nickel, chromium, aluminum, hexagonal boron nitride, iron, or a combination thereof. Other abradable materials may be used as well. The composition of the abradable coating 112 is such that if the tips of any of the teeth come in contact with the coating, the coating will preferentially wear away without damage to the teeth. In the particular embodiment shown, the downstream tip clearance 84 and upstream tip clearance 82 represent the distances between the abradable coating 112 of the packing ring and the tips of the downstream tooth 72 and upstream tooth 70, respectively. Other elements shown in FIG. 5 in common with those shown in FIG. 3 are discussed above.

Figure 6:
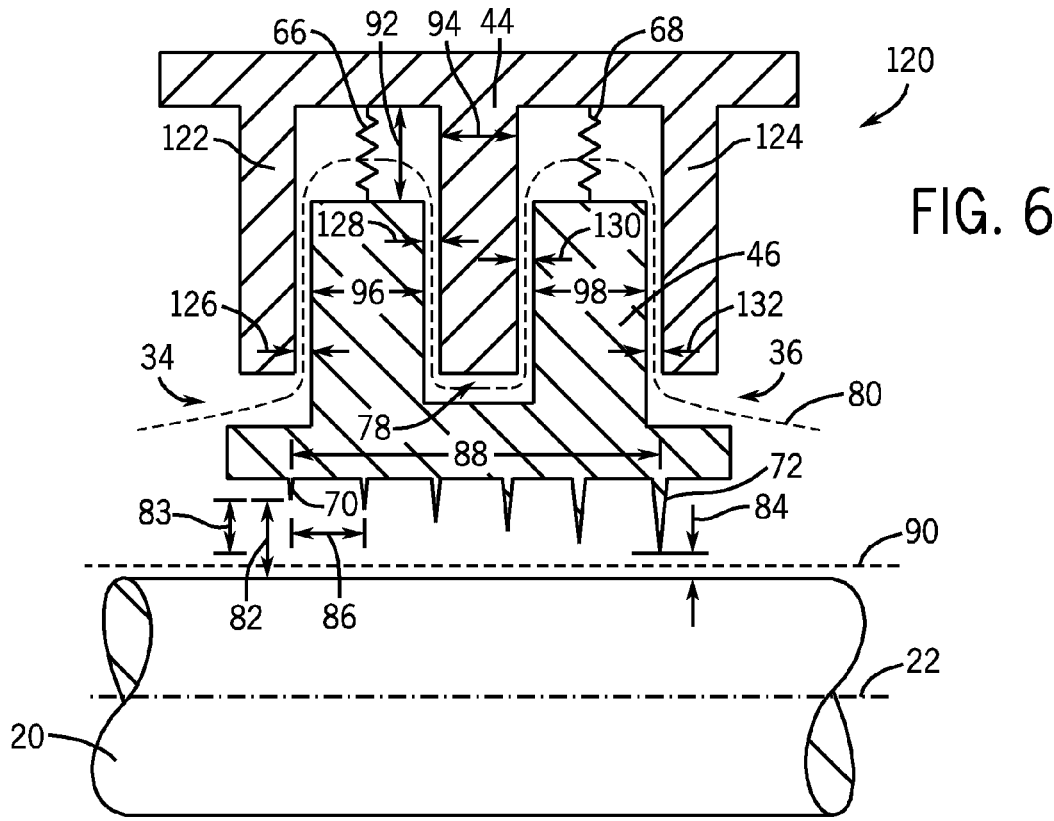
FIG. 6 is a cross-sectional view of a seal assembly with teeth on the packing ring and a plurality of plates in accordance with an embodiment of the present technique.

FIG. 6 is a cross-sectional view of an alternative embodiment of a seal assembly 120 with a plurality of plates. In the illustrated embodiment, in addition to the intermediate plate 44, there is an upstream plate 122 and a downstream plate 124. The addition of the upstream and downstream plates creates a more tortuous leakage path 80. Specifically, any gases passing through the leakage path 80 may go through gap #1 126 between the upstream plate 122 and the upstream portion of the packing ring 46, gap #2 128 between the upstream portion of the ring and the intermediate plate 44, gap #3 130 between the plate 44 and the downstream portion of the ring, and gap #4 132 between the downstream portion of the ring and the downstream plate 124. These gaps provide flow resistance to the leakage flow, and should be minimized to reduce leakage flow. Such a path 80 may reduce the amount of gas leakage compared to the paths shown in FIGS. 3 and 5. Other elements shown in FIG. 6 in common with those shown in FIG. 3 are discussed above.

Figure 7:
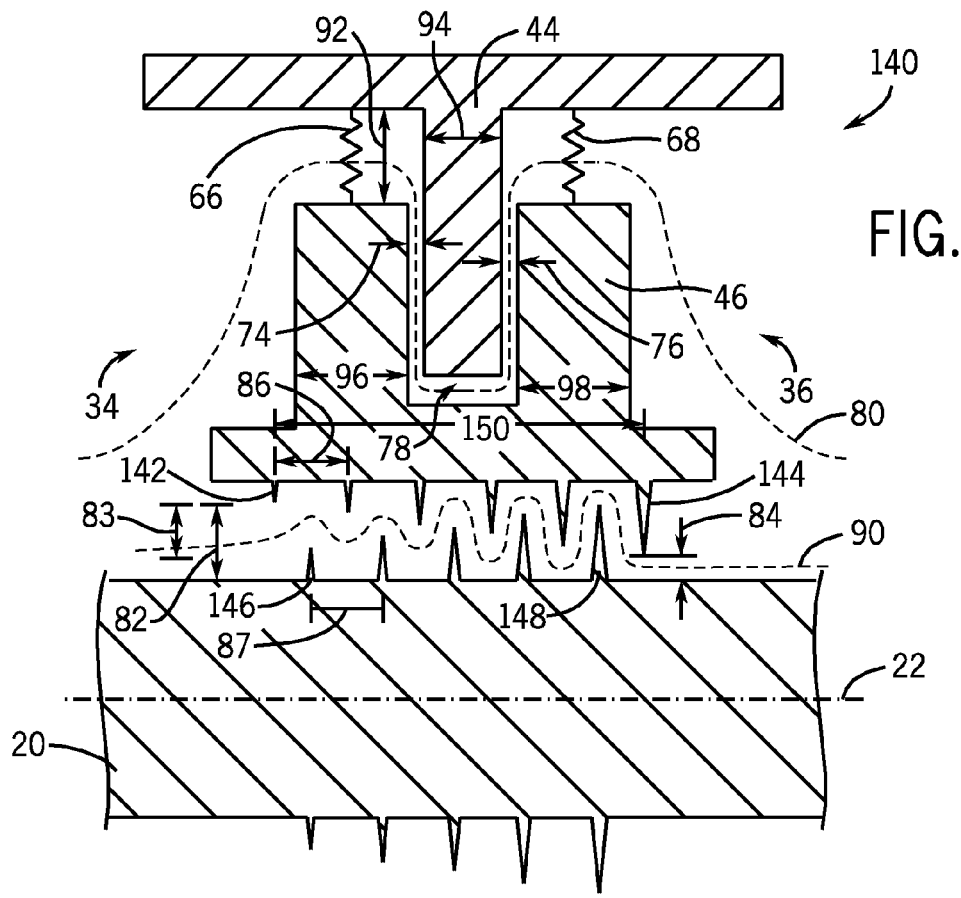
FIG. 7 is a cross-sectional view of a seal assembly with teeth on both the packing ring and rotating element in accordance with an embodiment of the present technique.

FIG. 7 is a cross-sectional view of an alternative embodiment of a seal assembly 140 with teeth disposed on both the packing ring 46 and the rotating element 20. In the illustrated embodiment, the packing ring 46 may include a plurality of arcuate teeth, including an upstream tooth 142 and a downstream tooth 144, disposed on the surface facing rotating element 20. Further, the rotating element 20 may include a plurality of arcuate teeth, including an upstream tooth 146 and a downstream tooth 148, disposed on the surface facing packing ring 46. The spacing 86 between adjacent teeth on the packing ring 46 may be different compared to the spacing 87 between adjacent teeth on the rotating element 20. As with the seal assembly 60 shown in FIG. 3, the spacing 86 and 87 between each tooth may be uniform or non-uniform. The width of the labyrinth seal 150 depends on the differential pressure across it and may be smaller than that of other labyrinth seals because of the smaller clearances. Using interlocking teeth may be advantageous as the leakage path 90 is more tortuous than an embodiment with only one set of teeth, resulting in less leakage. In certain embodiments, an abradable coating similar to that shown in FIG. 5 may be provided on the packing ring 46. Other elements shown in FIG. 7 in common with those shown in FIG. 3 are discussed above.

Figure 8:
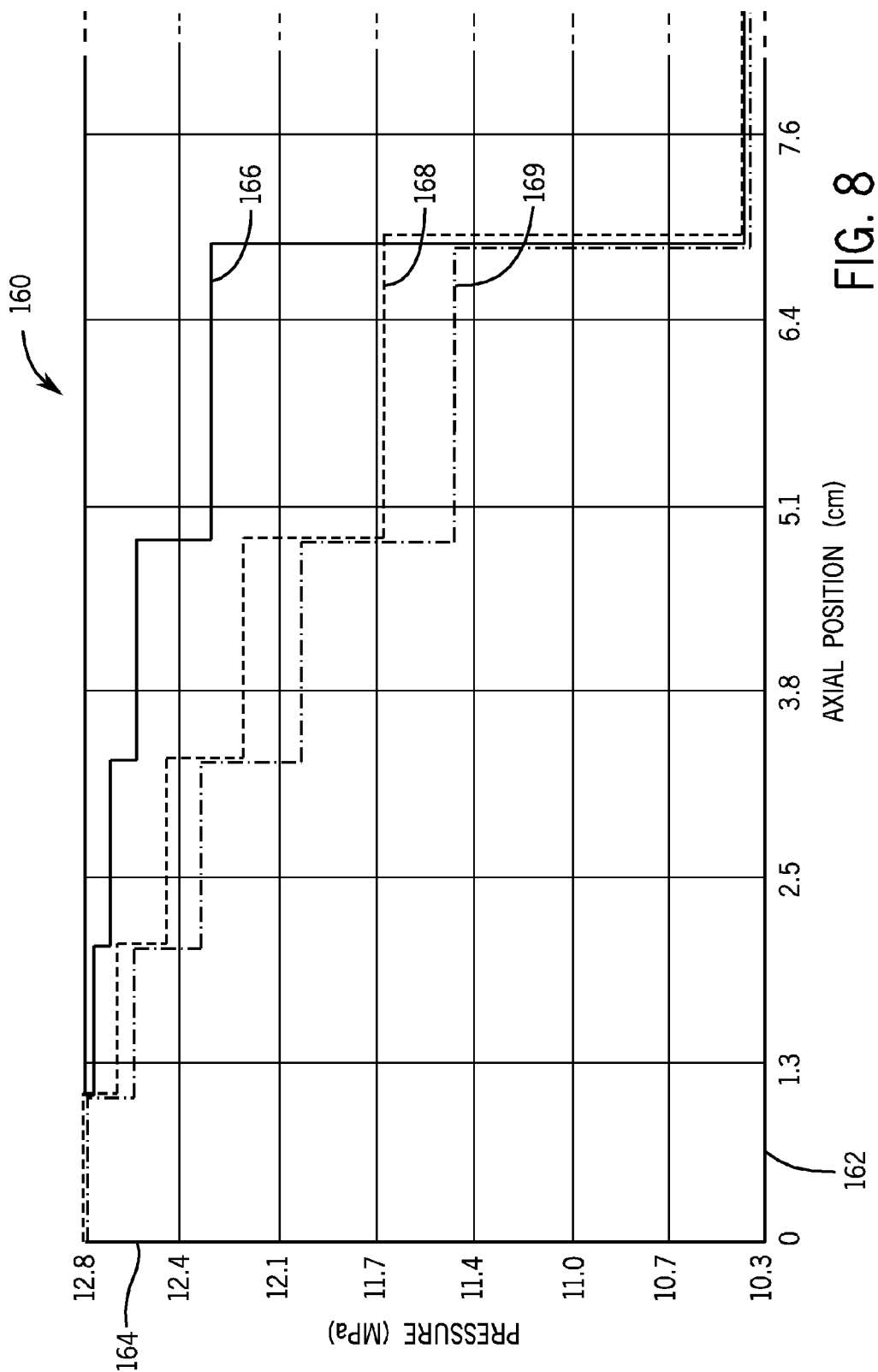
FIG. 8 is graph showing the expected pressure distribution under packing ring teeth as a function of the last tooth clearance, or tip clearance, in accordance with an embodiment of the present technique.

FIG. 8 is a graph 160 showing the simulation results of pressure distribution under packing ring teeth as a function of the last tooth clearance, or tip clearance. In the graph, the abscissa (x-axis) 162 represents the axial position of a tooth in centimeters and the ordinate (y-axis) 164 represents the pressure under the tooth in megapascal, for an upstream pressure of 12.8 MPa and downstream pressure of 10.3 MPa. The curves on this graph are referred to as the axial pressure profile. Three cases are shown: the first case 166 shows the pressure distribution when the last tooth clearance is 125 micrometers, the second case 168 is represents a clearance of 380 micrometers, and the last case 169 shows the results with a clearance of 635 micrometers. These three cases are used in the simulation to indicate the change in pressure profile (and the resulting force on the packing ring) as the packing ring moves radially inward or outward. In each case, there are five teeth, located at the same points along the axial direction, and the width of the seal is the same. The spacing between each tooth increases moving from left to right along the abscissa 162, making the spacing non-uniform. In addition, the tooth clearance progression for each case is the same, namely approximately 760 micrometers and the progression occurs linearly. In other words, using case 166 as an example, the clearances moving from the upstream tooth to the downstream tooth would be 890, 699, 508, 318, and 125 micrometers. Accordingly, the clearance of the upstream tooth for case 168 would be 1140 micrometers and for case 169 would be 1395 micrometers. In the graph shown, the pressure under each respective tooth of case 166 is higher than cases 168 and 169. Thus, as the clearance under the last tooth changes due to the change in tip clearance, the pressure profile changes as shown in FIG. 8.

Figure 9:
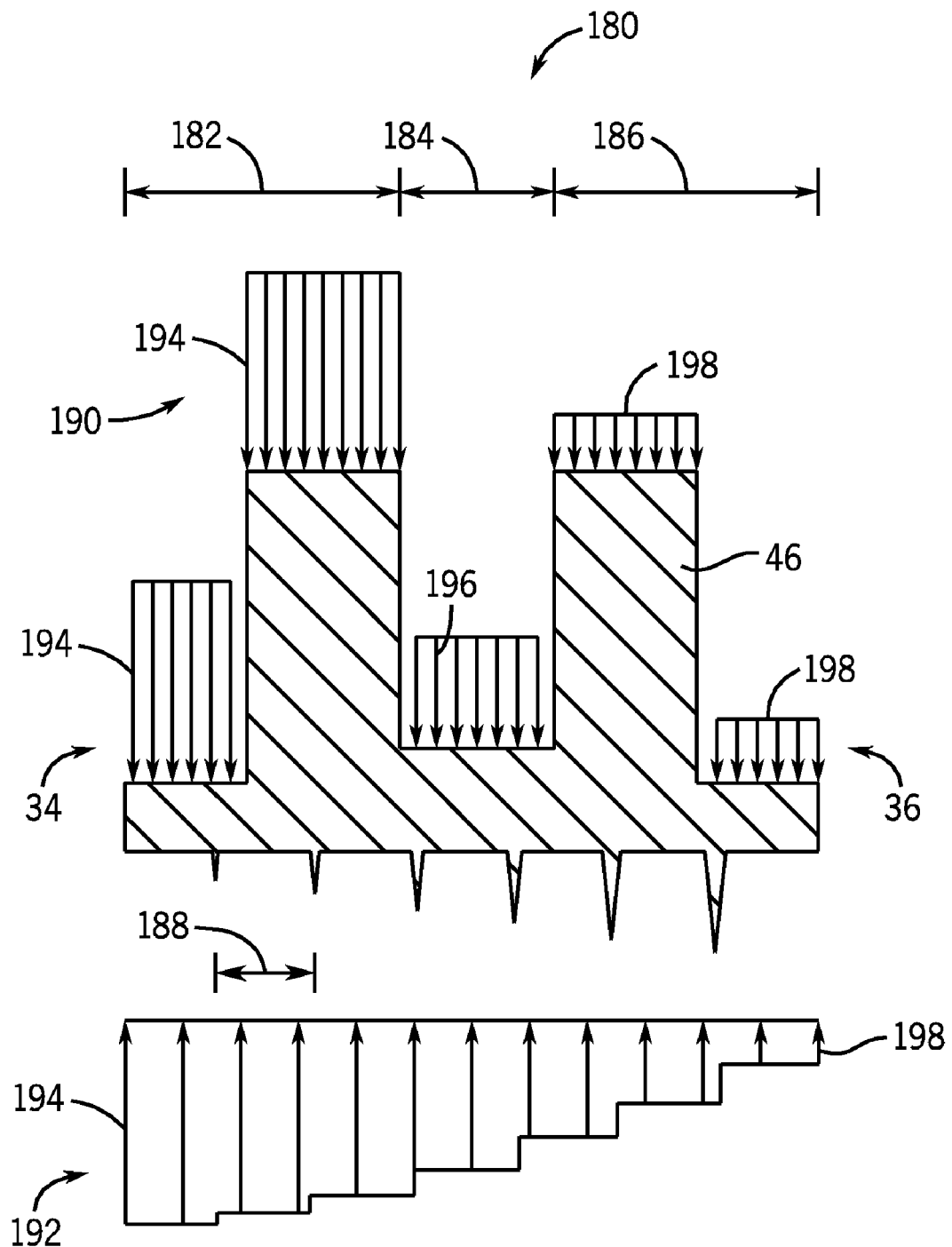
FIG. 9 is graph showing the closing and opening forces acting on a packing ring in accordance with an embodiment of the present technique.

FIG. 9 is a graph 180 showing the force balance in the radial direction for the packing ring 46; closing and opening forces acting on the packing ring are denoted as 190 and 192 respectively. Two different forces act on a packing ring. First, hydrodynamic forces are lift forces created on the packing ring because of rotation of the rotor. Second, hydrostatic forces are forces created on the packing ring because of the differential pressure across the seal assembly or any resulting leakage flow. The hydrodynamic forces are insignificant compared to the hydrostatic forces. The passive feedback of the disclosed embodiments is configured to affect hydrostatic forces resulting in a more robust design. Returning to FIG. 9, longer arrows represent larger pressure. In one embodiment, the distance 182 from the upstream side 34 to the beginning of the gap for the plate may be between approximately 2.5 cm and 5 cm. Similarly, the distance 186 from the gap to the downstream side 36 may also be between approximately 2.5 cm and 5 cm. The width of the gap 184 may be between approximately 1.2 cm and 4.0 cm. The distances 182, 184 and 186 can all be configured to change the closing force 190. The spacing 188 between each tooth may be uniform or non-uniform. The arrows shown pointing down and acting on the top of the packing ring represent the closing force 190. Correspondingly, the arrows pointing up and acting on the bottom of the packing ring represent the opening force 192. In the graph shown, three different amounts of pressure are exerted as closing forces 190. First, a high pressure 194 is exerted on the upstream portions of the packing ring, corresponding to upstream distance 182. Second, an intermediate pressure 196 is exerted on the gap portion of the packing ring, corresponding to gap distance 184. Finally, a low pressure 198 is exerted on the downstream portions of the packing ring, corresponding to downstream distance 186. The pressure, and thus the closing force, in each section are not affected by the radial movement of the packing ring, as represented by the arrows having the same height.

Turning to the opening forces 192, the pressure at the upstream side 194 is equal to the high pressure closing force and the pressure at the downstream side 198 is equal to the low pressure closing force. The opening forces 192 progressively decrease moving from the upstream to the downstream side as a function of the decrease in tooth clearance. The area under the pressure profile in FIG. 8 corresponds to the opening force 192 on the packing ring 46. For a small tip clearance, as in case 166, the area under the pressure profile is greater than the area under the pressure profile for a large tip clearance, as in case 169. Thus, the opening force is larger for a small tip clearance and smaller for a large tip clearance. Large tip clearances result in negative, or inward net radial forces, and small tip clearances result in positive, or outward net radial forces. The clearance where the closing and opening forces equal each other represents the equilibrium clearance. The equilibrium clearance is affected by a number of variables including the clearance progression profile (e.g. linear, quadratic, parabolic and so forth), the spacing between the teeth, the widths 182, 184, and 186 of the packing ring sections, and the ratio of the front gap to the back gap. These variables may be manipulated to achieve a desired equilibrium clearance, where leakage is reduced.

Figure 10:
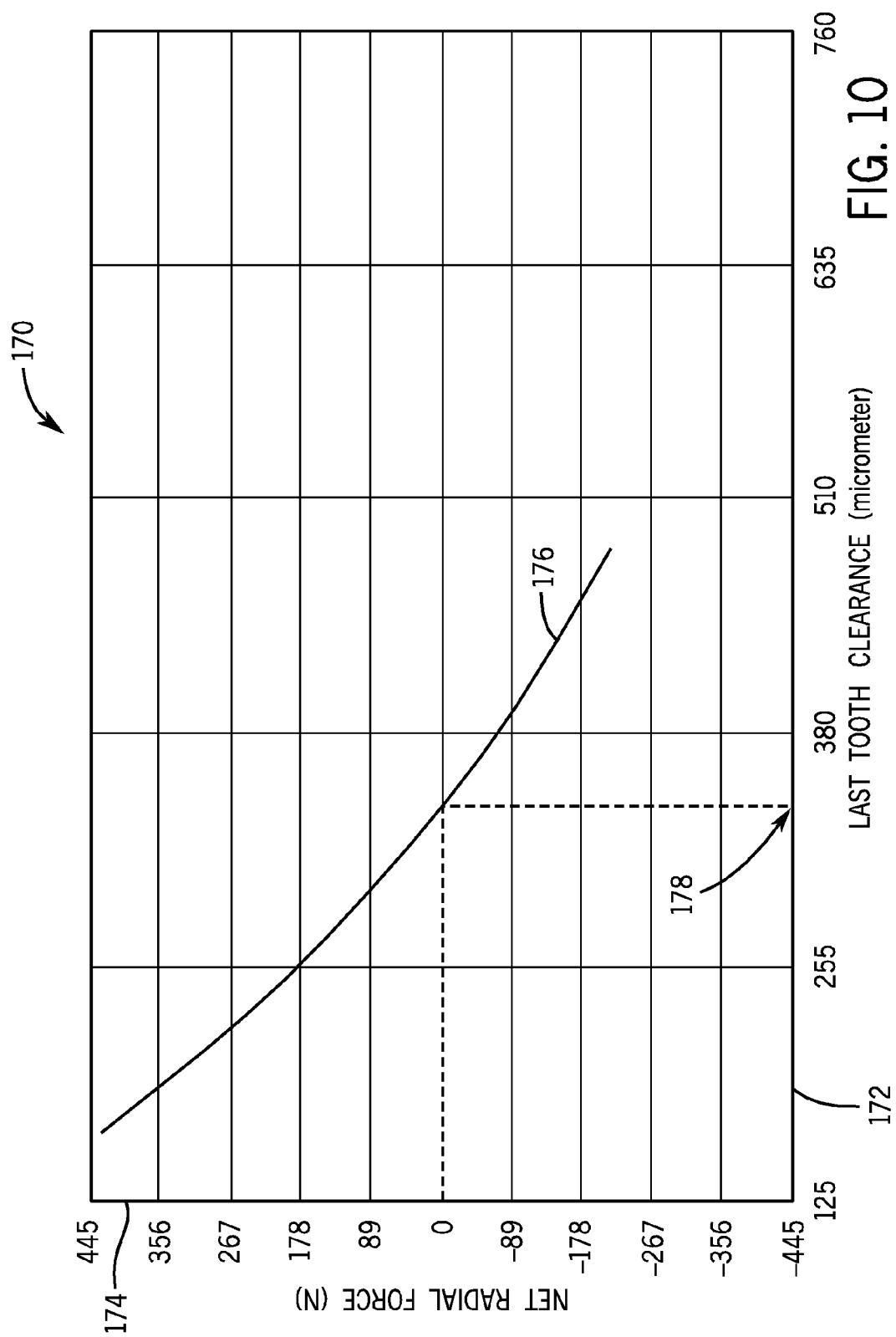
FIG. 10 is graph showing the concept of an equilibrium clearance in accordance with an embodiment of the present technique.

FIG. 10 is a graph 170 of simulation results showing the concept of an equilibrium clearance. In the graph, the abscissa 172 represents the last tooth clearance in micrometers and the ordinate 174 represents the net radial force in Newton. Here, a positive radial force corresponds to an outward radial force causing the packing ring to open and a negative radial force corresponds to an inward radial force causing the packing ring to close. Curve 176 shows the change in net radial force as a function of last tooth clearance. The equilibrium clearance 178 occurs when the net radial force is zero, resulting in no movement of the packing ring. For this simulation, the equilibrium clearance 178 occurs at approximately 340 micrometers. The relationship between equilibrium clearance and pressure ratio is discussed hereinafter with respect to FIG. 11.

Figure 11:
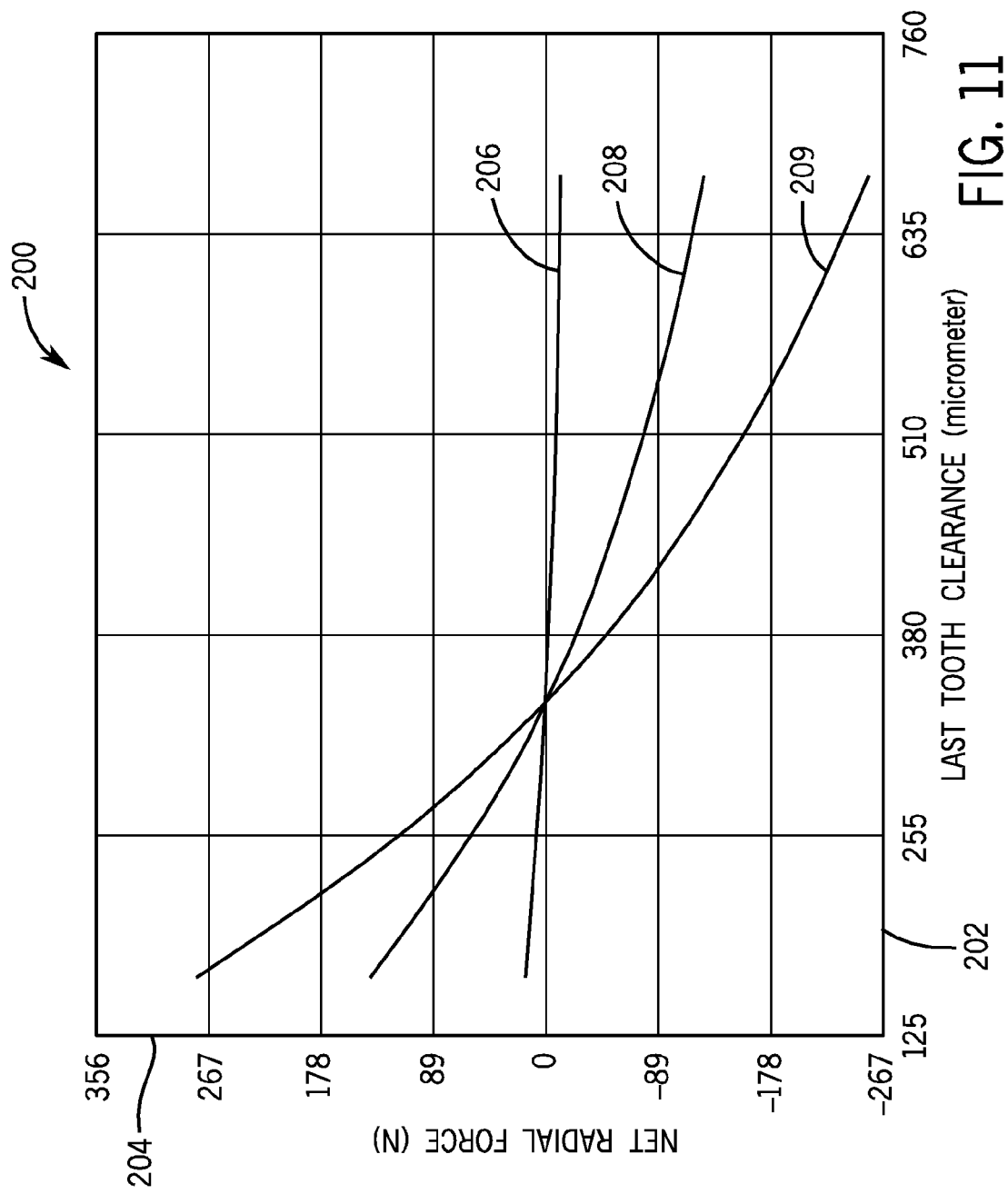
FIG. 11 is graph showing how the equilibrium clearance depends on the pressure ratio of the upstream and downstream pressures in accordance with an embodiment of the present technique.

FIG. 11 is a graph 200 of simulation results showing how the equilibrium clearance depends on the pressure ratio of the upstream and downstream pressures. In the graph, the abscissa 202 represents the last tooth clearance in micrometers and the ordinate 204 represents the net radial force in Newton. Three cases are shown: the first case 206 shows the radial forces when the upstream pressure is high, the second case 208 represents the radial forces when the pressure is near an intermediate value, and the last case 209 shows the results with a low pressure. In all three cases, the ratio of the upstream pressure to the downstream pressure is the same; the only difference is the pressure difference for each case. Thus, the simulation results of these three cases demonstrates that for a particular value of the ratio of upstream and downstream pressures, the sealing assembly will have approximately the same value of equilibrium clearance regardless of the values of the pressures.

Therefore, an advantage of the proposed seal is that even in the presence of larger rotor transients, a small clearance is maintained, resulting in less leakage and higher efficiency. This occurs because passive feedback introduces radially outward forces on the packing ring when the clearance is small, and radially inward forces when the clearance is large. This demonstrates the passive feedback phenomenon exhibited by the progressive clearance sealing assemblies described in the previous embodiments. Such passive feedback operates without any additional sensors or actuators that may fail or be unreliable in the harsh environment of a turbine or compressor. As pressure conditions change, the equilibrium clearance adjusts in such a way as to reduce the potential for turbine or compressor damage and leakage paths.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal assembly for a turbomachine, the turbomachine comprising a stationary housing and a rotor rotating about an axis, the seal assembly comprising:
    at least one arcuate plate coupled to an interior surface of the stationary housing and positioned in a radial plane;
    a circumferentially-segmented packing ring disposed intermediate to the rotor and the plate, wherein the packing ring is positioned to move along the plate in a radial direction;
    a plurality of arcuate teeth disposed intermediate to the packing ring and the rotor, wherein a clearance of each tooth decreases progressively going from an upstream side of the turbomachinery to a downstream side of the turbomachinery, wherein the progressive decrease in the clearances of the teeth creates a passive feedback in the hydrostatic forces generated by differential pressure across the seal assembly, such that as a tip clearance decreases, outward radial forces cause the packing ring to move away from the rotor and as the tip clearance increases, inward radial forces cause the packing ring to move toward the rotor; and
    a biasing member disposed intermediate to the arcuate plate and the packing ring and coupled to both.

2. The seal assembly of claim 1, wherein the biasing member acts as a bearing and restricts motion of the packing ring in the axial direction and allows motion of the packing ring in the radial direction.

3. The seal assembly of claim 1, wherein the passive feedback in hydrostatic forces maintains an equilibrium clearance between the plurality of teeth and the rotor, such that the plurality of teeth is prevented from contacting the rotor during rotor transients.

4. The seal assembly of claim 1, wherein the plurality of arcuate teeth are coupled to the packing ring.

5. The seal assembly of claim 1, wherein the plurality of arcuate teeth are coupled to the rotor.

6. The seal assembly of claim 1,
    wherein a first subset of the plurality of arcuate teeth is coupled to the packing ring;
    wherein a second subset of the plurality of arcuate teeth is coupled to the rotor; and
    wherein the first subset of the plurality of arcuate teeth and the second subset of the plurality of arcuate teeth are arranged such that the teeth interlock with each other.

7. The seal assembly of claim 1, wherein an abradable coating is disposed on the surface of the packing ring facing the rotor.

8. The seal assembly of claim 1,
    wherein the biasing member comprises a plurality of flexures mechanically coupled to the arcuate plate and the packing ring; and
    wherein the plurality of flexures are configured to allow the packing ring to move in the radial direction but restrict movement in an axial direction.

9. The seal assembly of claim 1, wherein a front gap and a back gap between the plate and the packing ring are configured to reduce leakage through the front gap and the back gap.

10. A method of sealing a gas path between a stationary housing of a turbomachine and a rotating element turning about an axis of the turbomachine, the method comprising:
    disposing at least one arcuate plate on the inner surface of the stationary housing in a radial plane;
    disposing a circumferentially-segmented packing ring adjacent to the arcuate plate;
    disposing a plurality of arcuate teeth intermediate to the packing ring and the rotating element, wherein tooth clearances decrease progressively going from an upstream side of the turbomachinery to a downstream side of the turbomachinery;
    disposing a biasing member intermediate to the packing ring and the stationary housing, wherein the biasing member is coupled to the packing ring and the stationary housing.

11. The method of claim 10, further comprising allowing the packing ring to move in a radial direction but restricting movement in an axial direction via a plurality of flexures of the biasing member, wherein the plurality of flexures are mechanically coupled to the arcuate plate and the packing ring.

12. The method of claim 10, further comprising disposing the plurality of arcuate teeth on the packing ring.

13. The method of claim 10, further comprising disposing the plurality of arcuate teeth on the rotating element.

14. The method of claim 10, further comprising:
    disposing a first subset of the plurality of arcuate teeth on the packing ring;
    disposing a second subset of the plurality of arcuate teeth on the rotating element; and
    arranging the first subset of the plurality of arcuate teeth and the second subset of the plurality of arcuate teeth such that the teeth interlock with each other.

15. The method of claim 10, further comprising disposing an abradable coating on the surface of the packing ring facing the rotating element.

16. A turbine or compressor comprising:
    a rotor rotating about an axis;
    a stationary housing surrounding the rotor; and
    a circumferentially-segmented seal assembly disposed intermediate to the rotor and the stationary housing, each segment of the seal assembly further comprising:
    at least one arcuate plate coupled to an interior surface of the stationary housing and positioned in a radial plane;
    an arcuate segment of a packing ring disposed intermediate to the rotor and the plate, wherein the packing ring is positioned to move along the plate in a radial direction, wherein the arcuate segment does not include a steam-seal joint;
    a plurality of arcuate teeth disposed intermediate to the packing ring and the rotor, wherein a clearance of each tooth decreases progressively going from an upstream side of the turbine or compressor to a downstream side of the turbine or compressor, wherein the progressive decrease in the clearances of the teeth creates a passive feedback in the hydrostatic forces generated by differential pressure across the seal assembly, such that as a tip clearance decreases, outward radial forces cause the packing ring to move away from the rotor and as the tip clearance increases, inward radial forces cause the packing ring to move toward the rotor; and a biasing member disposed intermediate to the arcuate plate and the arcuate segment of the packing ring, wherein the biasing member is coupled to the arcuate plate and the packing ring.

17. The turbine or compressor of claim 16,
wherein the biasing member comprises a plurality of flexures mechanically coupled to the arcuate plate and the packing ring; and
wherein the plurality of flexures are configured to allow the packing ring to move in the radial direction but restrict movement in an axial direction.

18. The turbine or compressor of claim 16, wherein the plurality of arcuate teeth is coupled to the packing ring.

19. The turbine or compressor of claim 16, wherein the plurality of arcuate teeth is coupled to the rotor.

20. The turbine or compressor of claim 16,
wherein a first subset of the plurality of arcuate teeth is coupled to the packing ring;
wherein a second subset of the plurality of arcuate teeth is coupled to the rotor, and
wherein the first subset of the plurality of arcuate teeth and the second subset of the plurality of arcuate teeth are arranged such that the teeth interlock with each other.

21. The turbine or compressor of claim 16, wherein an abradable coating is disposed on the surface of the packing ring facing the rotor.

* * * * *